United States Patent Office 3,567,493
Patented Mar. 2, 1971

3,567,493
METHOD OF CURING A ROOM TEMPERATURE VULCANIZABLE SILICONE COMPOSITION TO A VULCANIZED SILICONE RUBBER
James K. Wessel, Elizabethtown, Ky., assignor to Dow Corning Corporation, Midland, Mich.
No Drawing. Filed Feb. 19, 1968, Ser. No. 706,673
Int. Cl. B44d 1/14
U.S. Cl. 117—76  9 Claims

ABSTRACT OF THE DISCLOSURE

A method of curing a room temperature vulcanizable silicon composition to other cured silicone rubbers by applying a metal carboxylate to the surface of the cured silicone rubber prior to applying the room temperature vulcanizable silicone composition is disclosed. The room temperature vulcanizable silicone composition is a mixture of a hydroxylated organosiloxane polymer, a hydrocarbonoxy silicon compound or a silicon compound having silicon bonded hydrogen atoms, and a curing catalyst. The metal carboxylate can be illustrated by dibutyltindilaurate. This method is useful in sealing, encapsulating and bonding processes where some or all the parts are cured silicone rubber.

---

This invention relates to a method of bonding a room temperature vulcanizable silicone composition to cured silicone rubber.

A number of commercial operations involve the bonding of room temperature vulcanizable silicone compositions to cured silicone rubber. However, not all room temperature vulcanizable silicone rubber compositions bond satisfactorily to cured silicone rubber. It was found that when a room temperature vulcanizable silicone composition was applied to a cured silicone rubber, the room temperature vulcanizable silicone composition would not cure at the interface between the room temperature vulcanizable silicone rubber and the cured silicone rubber if the room temperature vulcanizable silicone rubber contained a hydroxylated organosiloxane polymer, a hydrocarbonoxy silicon compound containing silicon-bonded hydrogen atoms and a curing catalyst. The interface would remain completely uncured or would only cure in certain spots, regardless, the bond formed between the room temperature vulcanizable silicone rubber and the cured silicone rubber would be inadequate to serve any useful purpose. These room temperature vulcanizable silicone compositions are useful, desirable materials, since they possess advantageous properties. The present invention solves this problem.

It is therefore an object of the present invention to provide a method for curing a room temperature vulcanizable silicone composition to a cured silicone rubber.

This and other objects will become apparent from the detailed description of the present invention.

The room temperature vulcanizable silicone compositions are well known materials as shown by U.S. Pats. Nos. 2,588,393, 2,843,555, 2,902,467, 2,927,907, 3,070,566, 3,109,826, 3,110,689, 3,127,363, 3,151,099, 3,165,494 and 3,186,963; Canadian Pats. Nos. 576,680 and 577,528 and U.S. patent application Ser. No. 517,804, filed Dec. 30, 1965, by Larry Joe Tarno, among others.

The present invention provides a method of curing a room temperature vulcanizable silicone composition comprising a hydroxylated organosiloxane polymer, a cross-linker selected from the group consisting of hydrocarbonoxy silicon compounds and siloxane compounds having silicon bonded hydrogen atoms and a curing catalyst, on a surface of other vulcanized silicone rubbers comprising (I) applying to the surface of the vulcanized silicone rubber a metal carboxylate to form a treated surface and thereafter (II) applying over the treated surface a room temperature vulcanizable silicone composition comprising (A) a hydroxylated organosiloxane polymer having a viscosity of at least 100 cs. at 25° C., an average of at least 1.5 silicon bonded hydroxyl groups per molecule, and an average of from 1.9 to 2.01 monovalent radicals per silicon atom wherein the monovalent radicals are selected from the group consisting of hydrocarbon radicals and halohydrocarbon radicals, (B) a cross-linker selected from the group consisting of (1) hydrocarbonoxy silicon compounds having more than two silicon bonded hydrocarbonoxy radicals per molecule, and (2) siloxane compounds having an average of more than two silicon bonded hydrogen atoms per molecule, (C) a curing catalyst for (A) and (B), and (III) curing the combination.

The vulcanized silicone rubbers described above can be, for example, any of the well known silicone rubbers, except any silicone rubber which is within the scope of the room temperature vulcanizable silicone composition. These well known silicone rubbers include heat cured silicone rubbers, such as peroxide cured silicone rubber stocks, sulfur vulcanized silicone rubber stocks, inhibited platinum cured systems such as described in U.S. Pat. No. 3,192,181, and so on, room temperature vulcanized silicone rubbers such as the one package and two package room temperature vulcanizable stocks described in U.S. Pats. Nos. 3,077,465, 3,170,894, 3,122,522, 3,032,528, 3,035,016, 3,061,575, 3,133,891, 3,175,993, 3,296,161, 3,184,427 and 3,020,260, among others.

The vulcanized silicone rubber can take any of the useful shapes, such as tubing, sheet, coated wire, plate, gasket, rod, spherical form, block form, or any irregular shape. The particular shape of the vulcanized silicone rubber is unimportant to this invention, although it would be very important to the user.

The room temperature vulcanizable silicone composition of this invention comprises (A) a hydroxylated organosiloxane polymer, (B) a cross-linker which can be either (1) a hydrocarbonoxy silicon compound or (2) a siloxane compound containing silicon bonded hydrogen atoms and (C) a curing catalyst for (A) and (B). These room temperature vulcanizable compositions are well known in the art and many can be obtained commercially. Several references have been cited above to show these room temperature vulcanizable silicone compositions.

The room temperature vulcanizable silicone compositions for the purpose of this invention include those having a hydroxylated organosiloxane polymer. The hydroxylated organosiloxane polymers have a viscosity of at least 100 cs. at 25° C. The viscosity of the hydroxylated organosiloxane polymer can be fluids of 100 cs. at 25° C. or high gums, preferably the viscosities are 1000 to 100,000 cs. at 25° C. The hydroxylated organosiloxane polymers have an average of at least 1.5 silicon bonded hydroxyl groups per molecule and an average of from 1.9 to 2.01 monovalent radicals per silicon atom. The monovalent radicals can be monovalent hydrocarbon radicals or monovalent halohydrocarbon radicals.

The room temperature vulcanizable silicone composition is cross-linked by either hydrocarbonoxy silicon compounds which have an average of more than two silicon bonded hydrocarbonoxy radicals per molecule or siloxane compounds containing an average of more than two silicon bonded hydrogen atoms per molecule. Inasmuch as these room temperature vulcanizable silicone compositions are well known, further description will not be necessary. For convenience, a few cross-linkers can be mentioned, for example, ethylorthosilicate, ethylpolysilicate, methyltrimethoxysilane, vinyltrimethoxysilane, hydrocarbonoxy siloxane resins, siloxanes containing methylhydrogen siloxane units, 3,3,3-trifluoropropyltri(methoxyethoxy)silane, hexaethoxydisilane and bistriethoxysilylethane.

The curing catalysts can be any of those known in the art for the catalysis of (A) and (B). Some of these curing catalysts include, metal carboxylates, amines and other organic bases, amine salts, metal chelates, metal salts of thiols, metal oxides, organometal compounds, basic fillers, acid catalysts, metal hydroxides and metal nitrates.

These room temperature vulcanizable silicone compositions are described in detail in U.S. Pats. Nos. 2,588,393, 2,843,555, 2,902,467, 2,927,907, 3,070,566, 3,109,826, 3,110,689, 3,127,363, 3,151,099, 3,165,494 and 3,186,963, each of the foregoing patents being fully incorporated herein by reference.

Another room temperature vulcanizable silicone composition well known in the art comprises (a) from 0.01 to less than 5% by weight of a siloxane having at least three units per molecule of the formula RHSiO, any remaining units being of the formula $R_3SiO_{0.5}$ in which unit R is a monovalent hydrocarbon radical of less than 7 carbon atoms and (b) from greater than 95 to 99.99% by weight of a hydroxylated polysiloxane of at least 100 cs. viscosity at 25° C. in which essentially all of the molecules have at least two silicon-bonded OH groups attached thereto and in which there is on the average from 1.9–2 organic radicals per silicon atom, said radicals being monovalent hydrocarbon radicals of less than 8 carbon atoms and halohydrocarbon derivatives thereof.

Organosiloxane (a) can be any siloxane of the unit formula RHSiO in which there are at least three of these units per molecule and copolymers of these siloxanes with triorganosilyl siloxanes. Thus siloxane (a) includes hydroxyl endblocked linear polymers, cyclic polymers and linear triorganosilyl endblocked polymers. Specific examples of such siloxanes are methylhydrogensiloxane, phenylhydrogensiloxane, ethylhydrogensiloxane, butylhydrogensiloxane, vinylhydrogensiloxane and hexylhydrogensiloxane together with copolymers such as trimethyl endblocked methylhydrogensiloxane, dimethylhydrogen endblocked methylhydrogensiloxane and triethyl endblocked phenylhydrogensiloxane.

Siloxane (b) can be any hydroxylated polysiloxane fluid of at least 100 cs. viscosity at 25° C. wherein the organic groups can be any monovalent hydrocarbon radical of less than 8 carbon atoms such as methyl, ethyl, butyl, phenyl, tolyl, vinyl, allyl and cyclohexyl and any halogenated derivative thereof such as chloromethyl, pentafluoroethyl, tetrafluorocyclobutyl, chlorodifluorovinyl, α,α,α-trifluorotolyl, monochlorophenyl and pentabromophenyl. These fluids can be diorganosiloxanes or copolymers of diorganosiloxanes and limited amounts of monoorganosiloxanes and $SiO_2$ units. Essentially all of the molecules in siloxane (b) should have at least two silicon-bonded OH groups per molecule. These siloxanes can have molecular structures such as

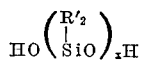

and

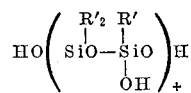

The upper limit of the molecular size of siloxane (b) is not critical so they may range from thin fluids to non-flowing gums. The term "essentially all" means that any nonhydroxylated siloxanes which are present in (b) act merely as diluents. Small amounts of these diluents can be tolerated but if they exceed 10 to 15% of the total weight of (b) they deleteriously affect the rate of cure.

In order to cure these compositions at room temperature, it is necessary to use a curing catalyst. The preferred catalysts are metallic salts of carboxylic acids and organometallic compounds. Specific examples of the former are ferric benzoate, ferric octoate, dibutyltindiacetate, lead octoate, manganese octoate, cupric octoate, monobutyltintrilaurate and iron cyclohexoate. Specific examples of organometallic compounds are tetralauryltin, tetraphenyl lead, tetraphenyltin, tetraethyl lead and tetraallyl lead.

The rate of curing of these compositions can be controlled by varying the amount of hydrogen containing siloxane (a) and by varying the amount of catalyst. The rate also varies with the viscosity of siloxane (b). In general, the rate of cure increases with increasing amounts of hydrogen containing siloxane up to about 4% by weight. After that the rate of cure remains essentially constant. The rate of cure also increases with increasing amount of catalyst. In general, the amount of catalyst employed should preferably be from about 0.001–1% by weight metal based on the weight of the polysiloxane. The rate of cure of the siloxane can also be increased by heat.

If desired, fillers such as silica, glass, asbestos, carbon black, organic fibers, metallic oxides, clays and other materials can be employed. The amount of filler will depend upon the desired durometer and properties in the finished product.

These well-known room temperature vulcanizable silicone compositions are siloxane rubbers.

Still other room temperature vulcanizable compositions well known in the art are the organosiloxane elastomer foams wihch comprise (c) a hydroxylated organopolysiloxane having a viscosity of at least 100 cs. at 25° C. and having on the average 1.9 to 2 monovalent hydrocarbon radicals, halogenated monovalent hydrocarbon radicals and hydrogen atoms per silicon atom, in said siloxane there being from 1 to 75% by weight based on the total weight of the siloxane of siloxane units containing at least one silicon-bonded hydrogen per silicon atom and said siloxane containing on the average at least 1.25 of the defined organic radicals per silicon atom, (d) up to 50 percent by weight based on the weight of the siloxane (c) of a hydroxylated compound and (e) from 0.1 to 10% by weight tin added as a stannous salt of a carboxylic acid which are mixed and thereafter allowed to foam to form an elastic product. The principle is believed to be the interaction of the silicon-bonded hydrogen with the hydroxyl groups to liberate hydrogen which causes the mixture to foam. Simultaneously, there is an interaction of the silicon-bonded hydrogen with the hydroxyls in siloxane (c) to form silicon-oxygen cross-links thereby curing the polymer to an elastomer. These reactions occur at a sufficiently rapid rate in the presence of the stannous salts of carboxylic acids.

Siloxane (c) can be either a copolymer in which the SiH and SiOH appear in the same molecules or it can be a mixture of a hydroxylated siloxane and an SiH containing siloxane. Regardless of whether (c) is a copolymer of hydroxylated siloxanes and SiH containing siloxanes or a mixture of these two types of materials, the overall composition of (c) must be within the above-defined limits. Preferably the amount of SiH containing siloxane is from 2 to 75% by weight of the total weight of siloxane (c).

When (c) is a mixture of components, the hydroxylated portion contains on the average from 1.9 to 2 monovalent hydrocarbon or halogenated monovalent hydrocarbon groups per silicon atom and has a minimum viscosity of 100 cs. at 25° C. However, a viscosity of at least 50 cs. at 25° C. is known to be operative, but not for the purposes of the present invention. There is no critical upper limit to the viscosity so that it can range in viscosity from relatively thin fluids to nonflowing gums. The hydroxylated siloxane can be either homopolymeric or copolymeric. The other component of the mixture must be present in the mixture in an amount so that the total weight percent of siloxane units having at least one H bonded to the silicon is from 1 to 75% by weight of the total weight of the mixture (c). The viscosity of this component is not critical and may range from materials having a viscosity of 1–2 cs. at 25° C. up to nonflowing gums. When this component is a gum, it is desirable to employ a solvent such as benzene, ether or the like in order to insure thorough mixing. This siloxane component can be a completely condensed material such as cyclic siloxanes or triorganosilyl endblocked siloxanes or it can contain SiOH groups. These siloxanes can be homopolymeric or copolymeric and those valences of the silicon which are not satisfied by H and O atoms are satisfied by monovalent hydrocarbon or halogenated monovalent hydrocarbon radicals. Preferably there is on the average at least 1 monovalent hydrocarbon or halogenated monovalent hydrocarbon radical per silicon atom.

Specific examples of copolymeric siloxanes which can be employed as (c) are 10 mol percent ethylhydrogensiloxane and 90 mol percent ethylmethylsiloxane; 25 mol percent $HSiO_{3/2}$, 25 mol percent dimethylsiloxane and 50 mol percent phenylmethylsiloxane; and 1 mol percent monophenylsiloxane, 5 mol percent $H_2SiO$, 4 mol percent octadecylmethylsiloxane and 90 mol percent dimethylsiloxane. All of these copolymers can contain SiOH groups.

Specific examples of mixtures which can be employed as siloxane (c) are mixtures of a hydroxylated dimethylsiloxane and $(MeHSiO)_5$, mixtures of a hydroxylated copolymer of dimethylsiloxane and diphenylsiloxane and a copolymer of methylhydrogensiloxane and trimethylsiloxane and mixtures of a hydroxylated copolymer of monomehtylsiloxane and dimethylsiloxane and a copolymer of methylhydrogensiloxane and dimethylhydrogensiloxane.

Siloxane (c), both mixtures and copolymers, can contain any of the following type of siloxane units, $R''SiO_{3/2}$, $R''_2SiO$, $R''_3SiO_{1/2}$, $R''HSiO$. $HSiO_{3/2}$, $RH_2SiO_{1/2}$, $H_2SiO$ and $SiO_2$. These various units must be in the proportions such that the ratio of organic radicals and hydrogen atoms to silicon will fall within the above-defined limits.

R groups on the silicon can be any monovalent hydrocarbon radical such as alkyl radicals such as methyl, ethyl, propyl or octadecyl; alkenyl radicals such as vinyl, allyl and hexenyl; cycloaliphatic radicals such as cyclohexyl, cyclopentyl and cyclohexenyl; aralkyl hydrocarbon radicals such as benzyl and aryl hydrocarbon radicals such as phenyl, tolyl, naphthyl and xenyl. The R groups can also be any halogenated monovalent hydrocarbon radical such as chlorophenyl, trifluorovinyl, chlorodifluorovinyl, trifluoropropyl, tetrafluoroethyl, bromoxenyl, $\alpha,\alpha,\alpha$-trifluorotolyl, tetrafluorocyclobutyl, chlorotrifluorocyclobutyl and heptafluoropentyl.

From the above description it can be seen that the hydroxyl groups and the silicon-bonded hydrogen can be located in any portion of the siloxane molecule. For example, the hydroxyl groups can be on the end of the siloxane chains or they can be along the chains or they can be located in both positions. The same is true of the silicon-bonded hydrogen atoms.

Preferably, this composition also contains a hydroxylated compound (d) in addition to the hydroxylated siloxane (c). Preferably hydroxylated compound (d) is present in an amount from 1 to 50% by weight based on the weight of siloxane (c). The function of this hydroxylated compound is to furnish excess hydroxyl groups for reaction with the silane hydrogen in order to produce sufficient gas to foam the composition. If desired, a mixture of two or more hydroxylated compounds (d) can be employed.

Any hydroxylated compound either organic or inorganic which is at least partially compatible with the siloxane system is operative. Hydroxylated compound (d) can be, for example, hydroxylated organosilicon compounds such as silanols, e.g., trimethylsilanol, triphenylsilanol, triethylsilanol and dimethylsilanediol and low molecular weight hydroxylated siloxanes such as sym-tetramethyldisiloxanediol; water; alcohols of less than 12 carbon atoms such as ethanol, butanol, 2,2,2-trichloro-1-ethoxyethanol glycol monoacetate, α-hydroxyisobutyronitrile, lactic acid, cyanic acid, 4-hydroxy-4-methyl-2-pentanone, 2-propyn-1-ol, isethionic acid, aldol, 4-chloroallyl alcohol, 2-nitro-1-butanol, 2-fluoroethanol, glycidol and hydracrylonitrile, cyclopentanol, 2,2'-thiodiethanol, 2-aminoethanol, acetol, acetoin, furfuryl alcohol, isopropanol and tertiary-butanol; glycols such as ethylene glycol, propylene glycol and hexylene glycol; glucose, glycerine, pentaerythritol; alkanol amines such as ethanol amine or triethanol amine; hydroxy esters, hydroxylated polyesters, hydroxy ethers such as hydroxyl ethylmethyl ether, polyethylene glycol, diethylene glycol; alcohols containing halogen, nitro, nitrile and other functional groups such as 3-butene-1,2-diol, bromalhydrate, 1-thioglycerol, glycerol-α-mononitrile glycerol ether, allanturic acid, araboric acid and 2-ethyl-2-nitro-1,3-propanediol; and carboxylic acids such as alpha-hydroxy-o-toluic acids, beta-alanine, bromomalonic, alpha-cyanopropionic, formic, acetic, isobutyric, butyric, malonic, succinamic, mercaptoacetic, benzoic, beta-chloroacrylic, acetoacetic, chloroacetic, acetonedicarboxylic, caproic and succinic acid. In case the hydroxylated compound is only sparingly soluble in the siloxane, it is best to use mutual solvents such as dioxane, ethers, benzenes or the like.

The use of hydroxylated compound (d) is optional since foams can be obtained by merely employing a mixture of siloxane (c) and the catalyst. This is particularly true where siloxane (c) contains a relatively low viscosity hydroxylated fluid. However, it is preferred to employ at least 1% of hydroxylated compound (d) since this gives superior foams.

The catalysts which are essential are stannous salts of carboxylic acids. These should be employed in amounts such that there is from 0.1 to 10% by weight tin based on the weight of siloxane (c). The stannous salt of any carboxylic acid is operative, for example, stannous acetate, stannous oleate, stannous stearate, stannous linoleate, stannous naphthenates, stannous benzoate, stannous naphthoate, stannous succinate, stannous sebacate, stannous lactate, stannous maleate, stannous crotonate, stannous salicylate, stannous phthalate, stannous mandelate, stannous cinnamate and the stannous salt of phenyl acetic acid.

The various ingredients can be mixed in any desired fashion. For example, one may mix all three ingredients simultaneously or one may mix a hydroxylated siloxane and a hydrogen containing siloxane to make up ingredient (c) and then dissolve the catalyst in hydroxylated compound (d) and thereafter mix the two mixtures. In fact, it is often desirable to mix the catalyst and hydroxylated compound (d) separately, particularly in those cases where the catalyst is not particularly soluble in siloxane (c). For example, an alcohol soluble salt can be incorporated in the mixture quite readily by first dissolving it in an alcohol, which serves as hydroxylated compound (d).

After the catalyst and siloxane (c) have been brought together foaming of the compositions begins in a very short time and is generally complete within 5 to 20 minutes. At the end of this time, the siloxane elastomer has gelled so that a permanent elastomeric foam is obtained.

The density of the foams can vary from 0.5 lb. per cu. ft. upwards. In general, the less dense foams are obtained under conditions which give the more rapid evolution of hydrogen coupled with conditions where gellation of the elastomer does not take place until a considerable degree of expansion has been obtained. For the less dense foams, it is desirable to use larger amounts of the SiH compound and/or larger amounts of the hydroxylated compound (d) than one would employ for the more dense foams. Foams of lighter density can be obtained by gentle warming of the mixture during foaming. In fact, it is often desirable but not essential that the mixtures be warmed during foaming particularly where extremely light and soft sponges are desired.

If desired, fillers may be incorporated in these elastomeric foams. Any desired filler can be employed although the preferred fillers are inorganic materials such as metal oxides such as titania, zinc oxide, ferric oxide and magnesium oxide, siliceous materials such as clay diatomaceous earth; fume silicas, silica aerogels and silica xerogels; ceramic materials such as powdered glass, asbestos, silicon, powder metals such as powdered aluminum and carbon black. The fillers can be employed in any desired amount. If desired, these compositions can contain other additives normally employed in silicone rubbers such as oxidation inhibitors, compression set additives, pigments and the like.

The metal carboxylate is applied to the surface of the cured silicone rubber as such, or in the form of any organic solvent solution. Any organic solvent can be used, but it is preferred to use an alcohol such as methanol, ethanol, isopropanol, butanol, amyl alcohol and the like. Other solvents include benzene, toluene, xylene, methylethylketone, acetone, methylisobutylketone, butylacetate, methylbenzoate, dimethylsulfoxide, trichloroethene and the like. The metal carboxylate can be applied to the surface of the cured silicone rubber by any of the conventional methods, such as brushing, spraying, wiping, rinsing, dipping and the like. The amount applied to the surface is not critical, as long as all the surface of the cured silicone rubber to which the room temperature vulcanizable silicone composition is to be applied comes in contact with the metal carboxylate. Preferably, any solution or dispersion of the metal carboxylate should contain at least 0.1 percent by weight metal carboxylate. The most effective means of applying the metal carboxylate is by brushing a mixture of 5 to 50 weight percent metal carboxylate in an organic solvent to the cured silicone rubber surface.

The metal carboxylates can be any metal carboxylate, for example, metals such as lead, tin, zirconium, iron, cadmium, titanium, calcium, manganese, zinc, copper, aluminum, cobalt, nickel, mercury, antimony, barium, bismuth, chromimum, magnesium, strontium, cesium, rubidium, potassium, sodium, lithium, and cerium and carboxylates sch as naphthenates, propionates, butyrates, hexoates, oleates, benzoates, laurates, linoleates, stearates, octoates, resinates, acetates, maleate, 2-ethylhexoate, adipate, sebacate, lactate, recinoleate, naphthoate, succinate, crotonate, salicylate, phthalate, mandelate, cinnamate, phenylacetate, cyclohexoate, suberate, cerotate, acetinate, cyclopentylacetate, trichlorobenzoate, formate, chloroacetate, 2-pentenoate, 2-hexenoate, tartrate, acrylate, terephahalate, p-methylbenzoate, cyclohexenylacetate, and ethylmalonate.

The metal carboxylate can include, for example, dibutyltin diacetate, dibutyltin dilaurate, dibutyltin di- octoate, stannous octoate, ferric octoate, lead laurate, cobalt naphthenate, tributyltin monolaurate, tin naphthenate, tin oleate, dibutyltin dimaleate, lead 2-ethylhexoate, iron stearate, antimony octoate, tin butyrate, lead naphthenate, chromium octoate, dibutyltin, dibenzoate, dibutyltin adipate, lead sebacate, dibutyltin dilactate, dibutyltin di-2-ethylhexoate, butyltin tri-2-ethylhexoate, cobalt 2-ethylhexoate, sodium naphthenate, zinc 2-ethylhexoate, manganese 2-ethylhexoate, tin recinoleate, phenyl mercury acetate, stannous acetate, stannous stearate, stannous linoleate, stannous benzoate, stannous naphthoate, stannous succinate, stannous sebacate, stannous lactate, stannous maleate, stannous crotonate, stannous salicylate, stannous phthalate, stannous mandelate, stannous cinnamate, stannous phenylacetate, ferric benzoate, cupric octoate, iron cyclohexoate, monobutyltin trioctoate, tributyltin monooctoate, cerium octoate, stannic benzoate, carbomethoxyphenyltin-trisuberate, isobutyltin tricerotate, cyclohexenyl lead triacetinate, xenyl lead trisalicylate, dimethyltin dibutyrate, divinyltin biscyclopentylacetate, diisoamyltin bistrichlorobenzoate, diphenyl lead diformate, dicyclopentyl lead bismonochloroacetate, dibenzyl lead di-2-pentenoate, diallyl lead di-2-hexenoate, triethyltin bitartrate, tributyltin acetate, triphenyltin acetate, tricyclohexyltin acrylate, tritolyltin terephthalate, tri-n-propyl lead acetate, tristearyl lead succinate, trinaphthyl lead p-methyl benzoate, trisphenylethyl lead cyclohexenyl acetate, triphenyl lead ethylmalonate, and calcium octoate.

The metal carboxylate is applied to the surface of the cured silicone rubber and then the room temperature vulcanizable silicone composition is applied to the treated surface. The combination is then cured by allowing it to stand at room temperature or by heating. The particular method of applying the room temperature vulcanizable silicone composition will be determined by the user and the nature of the composition. The user can spread it, pour it, dip it, and the like.

The present invention provides a means in a wide variety of industries for bonding a room temperature vulcanizable silicone composition to the surface of a cured silicone rubber. The room temperature vulcanizable silicone composition cures in a normal manner when applied to a surface of a cured silicone rubber which has been treated with the metal carboxylate.

This process is particularly useful when it is desired to bond a cured silicone rubber part to another substrate. The cured silicone rubber parts can be gaskets, sheets, or any other part. The substrate can be metal, wood, glass, ceramic and the like. One can apply the metal carboxylate to the cured silicone rubber, for example, a gasket, apply the room temperature vulcanizable silicone composition to the treated surface of the cured silicone rubber, and then place the surface having the uncured room temperature vulcanizable silicone composition on a substrate, such as metal and then curing the room temperature vulcanizable silicone composition. This process will bond the cured silicone rubber to the substrate and failures of the bond will no longer result from separation of the cured silicone from the room temperature vulcanizable silicone composition, because the room temperature vulcanizable silicone composition failed to cure at the interface.

Other areas where this process can be used is where an electrical device is to be encapsulated with the room temperature vulcanizable silicone composition and the electrical device contains cured silicone rubber. The surface of the cured silicone rubber is treated with the metal carboxylates and then the room temperature vulcanizable silicone composition is used to encapsulate the electrical device by conventional methods.

This method can also be used to seal tubing or insulation which is cured silicone rubber to each other or to other substrates. Further, this process can be used to repair cured silicone rubber articles which have been damaged. The damaged area is treated with the metal carboxylate and then the room temperature silicone rubber is applied to the treated surface.

Those skilled in the art of using room temperature vulcanizable silicone compositions will be aware of many other places where this method can be used. The present invention is intended to include any particular use where the room temperature vulcanizable silicone composition is bonded to cured silicone rubber.

The following examples are illustrative only and should not be construed as limiting the present invention which is properly delineated in the appended claims.

EXAMPLE 1

The surface of a commercial peroxide cured silicone rubber was abraded with an emery cloth until the sheen was removed. The abraded surface was then wiped with acetone and thereafter dibutyltin dilaurate was brushed on the surface and allowed to dry. To the treated dry surface, a room temperature vulcanizable silicone rubber composition of 51.9 parts by weight of a hydroxyl endblocked polydimethylsiloxane, 48.7 parts by weight filler, 2.9 parts by weight n-propylorthosilicate and 0.4 part by weight dibutyltin dilaurate was applied and the combination was allowed to stand for 7 days. The mixture cured to a rubber throughout, including the interface with the cured silicone rubber.

The above procedure was repeated except the abraded surface of the silicone rubber was not treated with dibutyltin dilaurate. The room temperature vulcanizable silicone rubber did not cure at the interface with the cured silicone rubber.

EXAMPLE 2

Several solvent solutions of dibutyltin dilaurate were prepared and applied to a commercial peroxide cured silicone rubber by brushing them on the surface to which was thereafter applied a particular room temperature vulcanizable silicone rubber composition. Each of the particular dibutyltin dilaurate solutions used is shown in the following table.

The room temperature vulcanizable silicone rubber compositions were mixtures—

(A)

| | Parts by weight |
|---|---|
| Hydroxylated polydimethylsiloxane having some of the molecules endblocked on one end by trimethylsiloxy groups and having a viscosity of 12,500 cp. at 25° C. | 76.9 |
| Phenylmethylvinylsiloxy endblocked polydimethylsiloxane fluid | 3.0 |
| n-Propylorthosilicate | 4.4 |
| Filler | 24.7 |
| Thickening agent | 0.6 |
| Dibutyltin dilaurate | 0.4 |

(B)

| | |
|---|---|
| Hydroxylated polydimethylsiloxane fluid of (A) above | 76.9 |
| Phenylmethylvinylsiloxy endblocked polydimethylsiloxane fluid | 4.3 |
| Ethylpolysilicate | 4.3 |
| Filler | 23.1 |
| Dibutyltin dilaurate | 1.4 |

(C)

| | |
|---|---|
| Hydroxyl endblocked polydimethylsiloxane having a viscosity of 4000 cs. at 25° C. | 48.3 |
| Filler | 48.9 |
| Isopropoxy endblocked polydimethylsiloxane fluid | 8.7 |
| Thickening agent | 1.9 |
| Dibutyltin dilaurate | 0.3 |

(D)

| | Parts by weight |
|---|---|
| Hydroxyl endblocked polydimethylsiloxane having a viscosity of 15,000 cs. at 25° C. | 52.5 |
| Filler | 56.2 |
| n-Propylorthosilicate | 0.95 |
| Dibutyltin diacetate | 3.0 |

| No. | Room temperature vulcanizable silicone rubber composition | Percent dibutyltin dilaurate in solvent |
|---|---|---|
| 1 | (A) | 50% in trichloroethene. |
| 2 | (A) | 25% in trichloroethene. |
| 3 | (A) | 10% in trichloroethene. |
| 4 | (A) | 5% in trichloroethene. |
| 5 | (A) | 50% in isopropanol. |
| 6 | (A) | 25% in isopropanol. |
| 7 | (A) | 10% in isopropanol. |
| 8 | (A) | 5% in isopropanol. |
| 9 | (A) | 50% in acetone. |
| 10 | (A) | 25% in acetone. |
| 11 | (A) | 10% in acetone. |
| 12 | (A) | 5% in acetone. |
| 13 | (B) | 50% in trichloroethene. |
| 14 | (B) | 25% in trichloroethene. |
| 15 | (B) | 10% in trichloroethene. |
| 16 | (B) | 5% in trichloroethene. |
| 17 | (B) | 50% in isopropanol. |
| 18 | (B) | 25% in isopropanol. |
| 19 | (B) | 10% in isopropanol. |
| 20 | (B) | 5% in isopropanol. |
| 21 | (B) | 50% in acetone. |
| 22 | (B) | 25% in acetone. |
| 23 | (B) | 10% in acetone. |
| 24 | (B) | 5% in acetone. |
| 25 | (C) | 50% in trichloroethene. |
| 26 | (C) | 25% in trichloroethene. |
| 27 | (C) | 10% in trichloroethene. |
| 28 | (C) | 5% in trichloroethene. |
| 29 | (C) | 50% in isopropanol. |
| 30 | (C) | 25% in isopropanol. |
| 31 | (C) | 10% in isopropanol. |
| 32 | (C) | 5% in isopropanol. |
| 33 | (C) | 50% in acetone. |
| 34 | (C) | 25% in acetone. |
| 35 | (C) | 10% in acetone. |
| 36 | (C) | 5% in acetone. |
| 37 | (D) | 50% in trichloroethene. |
| 38 | (D) | 25% in trichloroethene. |
| 39 | (D) | 10% in trichloroethene. |
| 40 | (D) | 5% in trichloroethene. |
| 41 | (D) | 50% in isopropanol. |
| 42 | (D) | 25% in isopropanol. |
| 43 | (D) | 10% in isopropanol. |
| 44 | (D) | 5% in isopropanol. |
| 45 | (D) | 50% in acetone. |
| 46 | (D) | 25% in acetone. |
| 47 | (D) | 10% in acetone. |
| 48 | (D) | 5% in acetone. |

All of the room temperature vulcanizable silicone rubber compositions cured completely at the interface with the peroxide cured silicone rubber.

EXAMPLE 3

When a solution of 0.1 weight percent dibutyltin dioctoate in isopropanol is sprayed on a commercial platinum-cured silicone rubber and then a room temperature vulcanizable silicone composition consisting of 100 parts by weight of a hydroxylated siloxane copolymer having 99.5 mol percent dimethylsiloxane units and 0.5 mol percent $SiO_2$ units and having a viscosity of 233 cs. at 25° C., 4 parts by weight of a trimethylsiloxy endblocked polymethylhydrogensiloxane, 50 parts by weight diatomaceous earth and 1.5 parts by weight dibutyltin dilaurate is applied to the treated surface of the commercial platinum cured silicone rubber. The room temperature vulcanizable silicone composition completely cures at the interface with the commercial platinum cured silicone rubber.

EXAMPLE 4

When the following metal carboxylates replace dibutyltin dilaurate in Example 2 and the peroxide cured silicone rubber is a gasket to be bonded to a metal part, the peroxide cured silicone rubber gasket adheres firmly to the metal and no uncured room temperature vulcanizable silicone rubber is observed:

tin naphthenate,
dibutyltin dimaleate,
chromium octoate,
dibutyltin adipate,
lead sebacate,
stannous lactate,
ferric benzoate,
cyclohexenyl lead triacetinate, and
cobalt 2-ethylhexoate.

That which is claimed is:

1. A method of curing a room temperature vulcanizable silicone composition comprising a hydroxylated organosiloxane polymer, a cross-linker selected from the group consisting of hydrocarbonoxy silicon compounds and siloxane compounds having silicon bonded hydrogen atoms and a curing catalyst on a surface of other vulcanized silicone rubbers comprising:
   (I) applying to the surface of the vulcanized silicone rubber a metal carboxylate to form a treated surface and thereafter
   (II) applying over the treated surface a room temperature vulcanizable silicone composition comprising:
      (A) a hydroxylated organosiloxane polymer having a viscosity of at least 100 cs. at 25° C., an average of at least 1.5 silicon bonded hydroxyl groups per molecule, and an average of from 1.9 to 2.01 monovalent radicals per silicon atom wherein the monovalent radicals are selected from the group consisting of hydrocarbon radicals and halohydrocarbon radicals,
      (B) a cross-linker selected from the group consisting of—
         (1) hydrocarbonoxy silicon compounds having more than two silicon bonded hydrocarbonoxy radicals per molecule, and
         (2) siloxane compounds having an average of more than two silicon bonded hydrogen atoms per molecule,
      (C) a curing catalyst for (A) and (B), and
   (III) curing the combination.

2. The cured article prepared in accordance with claim 1.

3. The method in accordance with claim 1 wherein the metal carboxylate is applied in an organic solvent solution having a concentration of metal carboxylates of at least 0.1 percent by weight.

4. The method in accordance with claim 1 wherein the metal carboxylate is a tin carboxylate.

5. The method in accordance with claim 3 wherein the metal carboxylate is a tin carboxylate.

6. The method in accordance with claim 4 wherein the tin carboxylate is dibutyltin dilaurate.

7. The method in accordance with claim 5 wherein the tin carboxylate is dibutyltin dilaurate.

8. The method in accordance with claim 7 wherein the organic solvent is an alcohol.

9. The method in accordance with claim 8 wherein the alcohol is isopropanol.

References Cited

UNITED STATES PATENTS

| | | | |
|---|---|---|---|
| 2,354,011 | 7/1944 | Gross | 156—326X |
| 2,601,337 | 6/1952 | Johannsen | 156—326X |
| 3,187,071 | 6/1965 | Radziejowski | 156—326X |
| 3,498,824 | 3/1970 | Chadha | 117—72 |
| 3,505,099 | 4/1970 | Neuroth | 117—72X |

BENJAMIN R. PADGETT, Primary Examiner

S. J. LECHERT, JR., Assistant Examiner

U.S. Cl. X.R.

117—72, 138.8, 161; 156—308, 329; 260—312